United States Patent [19]

Hogan et al.

[11] Patent Number: 5,155,186
[45] Date of Patent: Oct. 13, 1992

[54] ETHYLENE HOMOPOLYMER AND COPOLYMER POLYMERIZATION PROCESS AND THE PRODUCTS PRODUCED THEREFROM

[75] Inventors: John P. R. Hogan, Bartlexville, Okla.; Charles R. Nease, Seabrook, Tex.

[73] Assignee: Phillips Petroleum Company, Bartlesville, Okla.

[21] Appl. No.: 134,738

[22] Filed: Dec. 18, 1987

Related U.S. Application Data

[63] Continuation-in-part of Ser. No. 686,043, Dec. 24, 1984, abandoned.

[51] Int. Cl.$^5$ .......................... C08F 4/24; C08F 10/02
[52] U.S. Cl. ..................... 526/106; 526/100; 526/98; 526/348.5
[58] Field of Search .................. 526/100, 106

[56] References Cited

U.S. PATENT DOCUMENTS

| | | | |
|---|---|---|---|
| 3,037,008 | 5/1962 | Gretson et al. | 526/106 |
| 3,166,537 | 1/1965 | Gregg et al. | 526/106 |
| 3,174,957 | 3/1965 | Hall | 526/84 |
| 3,177,184 | 4/1965 | Cottle | 526/84 |
| 3,219,646 | 11/1965 | Czenkusch et al. | 526/100 |
| 3,227,699 | 1/1966 | Rendon et al. | 526/100 |
| 3,239,498 | 3/1966 | Witt | 526/106 |
| 3,275,615 | 9/1966 | Krvlisch | 526/352.2 |
| 3,288,767 | 11/1966 | Hogan et al. | 526/106 |
| 3,362,946 | 1/1968 | Hogan et al. | 526/106 |
| 3,365,439 | 1/1968 | Bjornson | 526/100 |
| 3,541,072 | 11/1970 | Witt et al. | 526/106 |
| 3,976,632 | 8/1976 | Delap | 526/106 |
| 4,001,196 | 1/1977 | Witt | 526/106 |
| 4,101,722 | 7/1978 | Hogan et al. | 526/106 |
| 4,146,695 | 3/1979 | Lumput | 526/106 |
| 4,208,497 | 6/1980 | Bronstert et al. | 526/138 |
| 4,247,421 | 1/1981 | McDaniel et al. | 526/106 |
| 4,277,587 | 7/1981 | McDaniel et al. | 526/100 |
| 4,307,214 | 6/1979 | McDaniel et al. | 526/106 |
| 4,370,458 | 1/1983 | Falbe et al. | 526/138 |
| 4,392,990 | 7/1983 | Witt | 526/106 |

FOREIGN PATENT DOCUMENTS

| | | | |
|---|---|---|---|
| 2272 | 6/1979 | European Pat. Off. | |
| 2673 | 6/1979 | European Pat. Off. | |
| 186174 | 7/1986 | European Pat. Off. | 526/106 |
| 2149681 | 10/1970 | Fed. Rep. of Germany | |
| 51-84886 | 7/1976 | Japan | 526/100 |
| 851112 | 10/1960 | United Kingdom | 526/142 |
| 851113 | 10/1960 | United Kingdom | 526/142 |

OTHER PUBLICATIONS

Gaylord et al., Linear and Stereoregular Addition Polymers, Interscience Publ. N.Y. (1959) pp. 273-274.

*Primary Examiner*—Edward J. Smith
*Attorney, Agent, or Firm*—Lynda S. Jolly

[57] ABSTRACT

A process has been discovered for the polymerization of ethylene and mixtures of ethylene with at least one other mono-1-olefin by employing a polymerization catalyst that produces polymers containing terminal vinyl unsaturation wherein such catalyst is exposed to a modifying agent prior to or during the polymerization reaction.

2 Claims, No Drawings

ETHYLENE HOMOPOLYMER AND COPOLYMER POLYMERIZATION PROCESS AND THE PRODUCTS PRODUCED THEREFROM

CROSS-REFERENCE TO RELATED APPLICATION

This application is a continuation-in-part of co-pending application Ser. No. 686,043, filed Dec. 24, 1984 and now abandoned.

BACKGROUND

This invention relates to the production of ethylene homopolymers and copolymers. In another aspect, this invention relates to a process for producing ethylene homopolymers and copolymers having exceptionally good environmental stress cracking resistance (ESCR). In yet another aspect, this invention relates to a process for producing ethylene homopolymers and copolymers with decreased long chain branching (also known as chain extension). In another aspect, this invention also relates to the products resulting from the practice of said process.

Prior art discloses the addition of seemingly small amounts (parts per million ranges) of catalyst poisons to alter the resultant polymer. However, even though some polymer properties may be improved, the catalyst productivity and/or catalyst activity are adversely affected. Furthermore, some of the prior art relates only to the older, low-productivity solution polymerization process.

One of the more important properties of polyethylene homopolymers and copolymers is their ESCR. In most polymerization processes, one can improve the ESCR of ethylene homopolymers or copolymers by lowering the melt index and/or density and/or by increasing the mono-1-olefin content in the case of copolymers. However, it is not always practical to simply lower the melt index or density or increase the comonomer content of copolymers, since other properties may be adversely affected. As used in the specification and the claims, ESCR means the environmental stress cracking resistance as determined by ASTM test D-1693, Condition A.

SUMMARY OF THE INVENTION

It is thus an object of this invention to provide a high productivity polymerization process to produce ethylene homopolymers and copolymers.

It is yet a further object of this invention to provide a polymerization process which does not decrease catalyst productivity.

It is another object of this invention to provide a polymerization process which does not significantly decrease catalyst activity.

It is yet a further object of this invention to provide a polymerization process to produce ethylene homopolymers and copolymers with increased ESCR, but maintain essentially the same melt index and density.

It is yet another object of this invention to provide a polymerization process to produce ethylene copolymers with increased ESCR, but maintain essentially the same mono-1-olefin content.

It is yet a further object of this invention to provide a polymerization process to produce ethylene homopolymers and copolymers with increased ESCR by adding certain modifying agents to the polymerization reaction.

It is yet another object of this invention to provide a polymerization process to control the long chain branching of ethylene homopolymers and copolymers.

It is yet a further object of this invention to provide a polymerization process to reduce the long chain branching of ethylene homopolymers and copolymers and maintain essentially the same melt index and density of ethylene homopolymers and copolymers.

It has been discovered that the ESCR of ethylene homopolymers and copolymers can be increased without lowering the melt index and/or density or increasing the mono-1-olefin comonomer content in the case of copolymers by the use of certain modifying agents during the polymerization reaction in slurry or gas phase polymerization processes.

According to the invention, a process has been discovered for the polymerization of ethylene and mixtures of ethylene with at least one other mono-1-olefin by employing a polymerization catalyst that produces polymers containing terminal vinyl unsaturation wherein such catalyst is exposed to a modifying agent during the polymerization reaction.

In one particular embodiment of the invention, the addition of approximately 0.2 moles of carbon monoxide per mole of catalytically active chromium present during the polymerization reaction as the treating agent results in an ethylene/1-hexene copolymer having an ESCR approximately two and one-half times greater than copolymer produced under substantially identical polymerization conditions except for the presence of the carbon monoxide treating agent, wherein the melt index and density are essentially identical in the two copolymers and there is no significant decrease in catalyst activity or reaction rate. Further according to the invention, new and useful ethylene homopolymers and copolymers are produced employing the process.

DETAILED DESCRIPTION OF THE INVENTION

Ethylene homopolymers and copolymers are produced according to the process of the present invention. As used herein, the term "copolymers" is intended to include the polymers produced employing ethylene with one or more comonomers wherein such comonomers are selected from aliphatic mono-1-olefins. Generally the aliphatic mono-1-olefins contain from about 3 to about 10 carbon atoms per molecule. For example, mono-1-olefins suitable for use in the invention include propylene, 1-butene, 1-pentene, 1-hexene, 1-heptene, 3-methyl-butene-1, 4-methyl-pentene-1, 1-octene, 1-nonene and 1-decene. The amount of comonomer employed can be selected over a broad range; however, generally the amount of comonomer employed is within a range of about 0.1 mole percent to about 10 mole percent based upon the total moles of olefin (ethylene and comonomer) employed.

The catalysts suitable for use in the invention are those that produce polymers containing terminal vinyl unsaturation. An example of such catalysts commonly used for producing homopolymers and copolymers of ethylene are those promoted with chromium ion. For example, chromium oxide on a silica support is a chromium-promoted polyethylene catalyst widely known in the art. Such catalysts, particularly when the chromium component is supported on silica, have produced excellent results when used in the present invention and are particularly suitable for use in the invention. Further the substrate can be only silica or it can be other refractory metal oxides such as alumina, boria, magnesia, thoria, titania, zirconia and mixtures of any two or more thereof with or without silica. The refractory metal oxide support can be admixed in a hydrogel or dry state with the chromium compound employing well known techniques such as impregnation with an aqueous or non-aqueous solution of a chromium compound, including admixture of particulate chromium compounds, and the like. Further, such catalyst can be treated with titanium compounds by impregnation or coprecipitation. Some examples of chromium ion based catalysts suitable for use in the invention are disclosed in U.S. Pat. Nos. 3,887,494; 4,392,990 and 4,312,967 assigned to Phillips Petroleum Company and U.S. Pat. No. 3,900,457 related to silica supports also assigned to Phillips Petroleum Company, all of which are incorporated by reference herein. As noted in U.S. Pat. No. 2,825,721, the activated chromium ion based catalyst contains mainly chromium oxide ($CrO_3$), which is the active form of the chromium ion before the catalyst contacts the monomer(s).

The essential feature of the present invention is in the use of a modifying agent to treat the catalyst during the polymerization reaction. The modifying agent, while added during the polymerization reaction, can be introduced into the polymerization reactor by any means. For example, the modifying agent can be combined with any stream into the polymerization reactor such as, the hydrocarbon diluent stream, the ethylene feedstream and/or the comonomer (if present) feedstream. Additionally, the modifying agent can be introduced into the polymerization reactor as a separate stream. Thus, the modifying agent, preferably, first contacts the catalyst in the presence of the monomer or monomers.

A number of modifying agents are suitable for use in the invention and include those selected from carbon monoxide, carbonyl sulfide, hydrogen sulfide, oxygen, water, alcohols, aldehydes, ketones, mercaptans, amines, and mixtures of any two or more thereof. Some of the alcohols suitable for use in the invention include, for example, methanol, ethanol, 2-methoxy ethanol, isopropanol, etc. Some aldehydes suitable for use in the invention include, for example, formaldehyde, acetaldehyde, propanoldehyde, etc. Some ketones suitable for use in the invention include, for example, acetone, methyl-ethyl ketone, methyl-isobutyl ketone, etc. Some amines suitable for use in the invention include, for example, methylamine, diethylamine, triethylamine, etc. Of the above-named treating agents, carbon monoxide and methanol are preferred because thus far they appear to be the most effective and convenient to use.

The amount of modifying agent added to the polymerization reactor can best be expressed as a ratio of moles of modifying agent to moles of chromium ion in the polymerization catalyst. However, all molar ratios of modifier to chromium expressed herein refer to ratios to be obtained by dividing moles of modifying agent by moles of chromium, only up to 1 weight percent total chromium in the catalyst, even if the catalyst contains more than 1 weight percent chromium. This is because the use of more than 1 weight percent in the catalyst does not further increase catalyst activity and, for this purpose, the excess of chromium over one weight percent is superfluous. The molar ratio is generally within the range of about 0.01 to about 2 and preferably within the range of about 0.05 to about 1. Most preferably, the molar ratio of moles of modifying agent per mole of active chromium ion in the polymerization catalyst is within the range of about 0.15 to about 0.4, for best control of polymer long chain branching and greatest increase in ESCR, with a minimal reduction in catalyst productivity and catalyst activity.

The amount of modifying agent added to the polymerization reactor can also be expressed as a concentration, of parts per million by weight (hereinafter referred to simply as parts per million or ppm) based on the total olefin present in the polymerization reactor. When the concentration of modifying agent is expressed in terms of ppm, the preferred concentration of modifying agent in the polymerization reactor can vary because of the different molecular weights of the different modifying agents.

The concentration of modifying agent employed is generally within the range of about 0.01 to about 2 parts per million by weight. In instances where the modifying agent is selected from carbon monoxide, carbonyl sulfide, hydrogen sulfide, oxygen, water, and mixtures of any two or more thereof, the concentration of modifying agent is more often within the range of about 0.1 to about 1 parts per million and most often within the range of about 0.1 to about 0.7 parts per million based on total olefin present during the polymerization reaction. When the modifying agent is selected from alcohols, aldehydes, ketones, mercaptans, and amines and mixtures of any two or more thereof, the concentration of modifying agent is more often within the range of about 0.2 to about 2 parts per million and most often within the range of about 0.2 to about 1.5 parts per million based on total olefin present in the polymerization reactor.

Since one aspect of the present invention is a process that produces ethylene-type polymers having an increase, in fact, a large increase, in ESCR compared to the polymer produced under substantially identical polymerization conditions except for the presence of the modifying agent, another way to express the amount of modifying agent is in terms of the amount necessary to increase the ESCR of the polymer produced to the desired ESCR value. Generally the amount of modifying agent employed will be that which is to at least double the ESCR of the polymer and in most cases triple the ESCR of the polymer compared to the polymer produced under substantially identical polymerization conditions except for the presence of the modifying agent. The numerical ranges for the modifying agents described above generally provide a two to three fold improvement in ESCR.

In other words, the minimum amount of modifying agent required is that which is necessary to increase the ESCR of the polymer produced compared to the polymer produced under substantially identical polymerization conditions except for the presence of the modifying agent. As described in the background of the invention, this invention is based on the discovery that the ESCR of ethylene-type polymers can be increased without changing the melt index or density or without increasing the comonomer content. The term "under identical conditions" (or "under substantially identical polymerization conditions") referred to in this disclosure means that the polymers produced with and without the modifying agent were produced under essentially the same polymerization reactor operating conditions. Additionally, the resultant polymers produced under substantially identical polymerization conditions, both with and without the addition of a modifying agent to the polymerization reactor, have essentially the same melt index, density and comonomer content.

In addition to increasing the ESCR of ethylene-type polymers, the invention also provides a process to control the long chain branching (chain extension) of ethylene-type polymers produced with chromium ion-promoted catalysts. Although not directly related, ESCR at a constant melt index is indicative of the amount of long chain branching. Usually, the amount of long chain branching is decreased. Controlling the amount of modifying agent added to the high productivity polymerization reactor controls the amount of long chain branching in polymers produced in slurry or gas phase polymerization processes. Long chain branching does not occur with chromium-promoted catalysts in solution polymerization.

Although this invention is not limited by theory, the formation of a small but very significant amount of long chain branching over the chromium oxide catalyst, at slurry polymerization conditions, has been demonstrated. The mechanism of long-chain branch formation is understood as follows: Termination of a normal chain results in the formation of a vinyl group. The terminated chain end remains near the active site, since the growing chain crystallizes as it forms, making the polymer molecule relatively immobile. Occasionally, a terminated chain end (vinyl group) reacts with the active catalyst site during the growth of another chain, thus forming a branch about equal in length to a typical polymer molecule.

The modifying agents can substantially reduce the activity of the catalyst if excessive amounts are used. According to the invention, the modifying agent can be used in an amount sufficient to increase the ESCR without decreasing the catalyst activity substantially. Generally the amount of modifying agent employed is that amount which will not reduce the catalyst activity more than about 25% when the catalyst activity is calculated in terms of grams of polymer per gram of catalyst per hour (g/g/hr) and when the catalyst activity is compared to that of the catalyst in the absence of the modifying agent under otherwise identical polymerization times and conditions. More often, the amount of modifying agent employed will be that amount which will not reduce the catalyst activity more than about 10% and more preferably not more than about 5% compared to the catalyst activity in the absence of a modifying agent.

Although the modifying agent can have a slight negative impact on catalyst activity, the modifying agent does not substantially affect catalyst productivity. Thus, the polymerization reaction is not hindered in any way because the catalyst productivity is not changed; catalyst productivity is maintained at the same level with and without the use of a modifying agent.

The other high productivity polymerization reaction parameters employed in accordance with the present invention are essentially the same as the polymerization parameters employed when no modifying agent is employed, considering the type of homopolymer or copolymer produced, the catalyst employed, the polymerization medium, etc. The process of the present invention is suitable for use in gas phase or slurry phase polymerization reactions, where long chain branching may occur, but it is not applicable in solution phase polymerization, where long chain branching does not occur over the chromium-promoted catalyst. All of these polymerization processes and conditions are well known by those skilled in the art and need no further elaboration.

EXAMPLE

This example describes a typical polymerization procedure used herein to prepare ethylene-hexene-1 copolymers and illustrates the effect that the presence of a small amount of modifying agent, specifically carbon monoxide (CO), during polymerization has on the performance properties of the polymeric products. The catalyst, 30 cubic centimeters of a 1 weight percent Cr (present as oxides) on silica (Davison 969 MSB), manufactured by the Davison Chemical Company, Baltimore, Md., was first activated by placing it in a vertical quartz tube (about 1 inch I.D. × 18 inches) having an integral fritted catalyst support and passing air through the catalyst at 52 Liters/hour while heating the tube and catalyst at 400° C./hour to 650° C. and holding at 650° C. for 5 hours. The catalyst was removed and stored in a dry glass flask under a nitrogen atmosphere and placed in a desiccator.

In Tables I and II, all runs were carried out employing the catalyst described above. The amount of modifying agent employed in each run is shown and each run was carried out in the following manner.

To a nitrogen-purged, methanol jacketed (110° C.), stainless steel 2 Liter capacity reactor fitted with a stirrer was charged about 0.04 to 0.06 grams of the activated catalyst described above plus 1.25 pounds (567 grams) of isobutane and the stirrer started. Ethylene was then added until the reactor pressure reached 475 psig. During this pressure-up period there was also added about 2 to 2.5 g of 1-hexene. In addition, in runs 2 through 5 the quantity of modifying agent (CO) was swept into the reactor with the ethylene. When the desired polymerization pressure was reached (475 psig) there was a short induction period when no significant amount of ethylene was taken up as determined by a rotameter. The ethylene take-up then began and the run was continued until an estimated productivity of 4000 grams of polymer/gram catalyst was reached (usually about 1 hour). Temperature was controlled at about 102° C. by varying the pressure on the methanol in the reactor jacket. This estimated productivity was compiled from calibrated ethylene rotameter readings taken at 10-minute intervals. During each run, 1-hexene was simultaneously added at about 0.5 weight percent of the rate of ethylene being continuously charged. A total of about 3 to 4 grams of 1-hexene was added to the reactor including the 1-hexene added during the pressure-up period to establish the required concentration in the reactor.

Each run was terminated by venting the reactor (depressurizing) and cooling below the boiling point of the methanol heating fluid. The polymer was removed and weighed to determine the exact polymer yield (typically about 200 g). The polymer was added to a plastic jar along with a stabilizer package containing three antioxidants, 0.05 weight percent each of butylated hydroxy toluene (BHT), dilauryl-dithio-diproponate (DLTDP) and 4,4'-thiobis(6-tert-butyl-m-cresol) (Santonox R), made by Monsanto Chemical Company, St. Louis, Mo. all dissolved in acetone. After tumbling and mixing for several minutes, the contents were poured into a flat pan and dried in a vacuum oven at 100° C. for 30 minutes. The polymer was next melt-mixed on a two-roll mill for three minutes at about 150°–160° C.

(melting point of polymer 130° C.). The polymer was then chopped into small pieces (0.125 to 0.25 inch diameter) and the HLMI, determined according to ASTM Method D1238, Condition F, and density were measured. In addition, the ESCR was determined. The ESCR values given are the actual test values. The ESCR values have not been adjusted for any other factors, such as, for example, density and/or melt index. The results of each run are listed in Table I below.

In this example, several control runs are exhibited which, as near as possible, fall within the same ranges of HLMI and density as the invention runs with which they are correlated, since both these properties affect ESCR strongly (lower HLMI's and lower densities typically result in higher ESCR's).

(run 1) without the CO to 800–1000 hours with the CO (runs 2 and 3). The data also show that increasing CO to molar ratios of 0.33 and 0.40 (0.40 ppm) in runs 4 and 5 provided little or no improvement in ESCR as compared to runs 2 and 3 and decreased the catalyst activity compared to runs 2 and 3 under the conditions employed.

The runs just discussed involved batch operations of a bench reactor employing the slurry process. In continuous operation of larger reactors, it is only necessary to carefully adjust the feed rate of the modifying agent to the specified concentration. Feeding the modifying agent at very low rates is facilitated by using a diluted mixture of the modifying agent in a suitable inert gas or liquid.

TABLE I

Effect of CO as the Modifying Agent In Ethylene/Hexene-1 Polymerization

| Run No. | Type of Run | Modifying Agent, CO ppm[a] | Molar ratio, CO/Cr | Induction, mins. | Catalyst Activity, g/g hr. | Productivity, Grams Polymer Per Gram Catalyst (g/g) | HLMI[b] | Density,[c] g/cc | ESCR,[d] hrs. |
|---|---|---|---|---|---|---|---|---|---|
| 1 | Control | 0 | 0 | 10 | 4110 | 3910 | 9 | .9490 | 335 |
| 2 | Invention | 0.2 | 0.20 | 30 | 4170 | 4170 | 9 | .9486 | 808 |
| 3 | Invention | 0.2 | 0.19 | 10 | 4750 | 3960 | 7 | .9489 | >1000 |
| 4 | Invention | 0.4 | 0.33 | 20 | 3680 | 3680 | 9 | .9480 | 959 |
| 5 | Invention | 0.4 | 0.40 | 20 | 3180 | 3970 | 7 | .9498 | 839 |

[a]Based on approximate weight of ethylene plus hexene-1 present.
[b]Test Method ASTM D 1238, Condition F.
[c]Test Method ASTM D 1505. Sample prepared by ASTM D 1928-80. Procedure C; sample conditioned by ASTM D 618, Procedure A.
[d]Test Method ASTM D 1693, Condition A.

The data shown in TABLE 1 illustrate that at a molar ratio of about 0.2 (0.2 ppm) CO the catalyst activity and productivity were basically about the same as the control (run 1) but the ESCR was increased from 335 hours Additional laboratory work was carried out employing several different modifying agents, and the results are shown in Table II below.

TABLE II

| Run No. | Type of Run | Modifying Agent | Molar ratio, (modifying agent)/(Cr) | PPM[a] | Reactor Temp. °C. | Run Time Min. | Catalyst Activity, g/g/hr. | Productivity, Grams Polymer Per Gram Catalyst (g/g) | HLMI[b] | Density,[c] g/cc | ESCR,[d] hrs. |
|---|---|---|---|---|---|---|---|---|---|---|---|
| 6 | Invention | CO | 0.19 | 0.2 | 101 | 50 | 4750 | 3960 | 7 | 0.9489 | >1000 |
| 7 | Invention | CO | 0.20 | 0.2 | 102 | 60 | 4170 | 4170 | 9 | 0.9486 | 808 |
| 8 | Invention | CO | 0.33 | 0.4 | 102 | 60 | 3680 | 3680 | 9 | 0.9480 | 959 |
| 9 | Invention | CO | 0.40 | 0.4 | 101 | 75 | 3180 | 3970 | 7 | 0.9498 | 839 |
| 10 | Invention | $O_2$ | 0.22 | 0.27 | 101 | 50 | 4360 | 3630 | 11 | 0.9495 | 882 |
| 11 | Control for Runs 6–10 | None | 0 | 0 | 101 | 57 | 4110 | 3910 | 9 | 0.9490 | 335 |
| 12 | Control for Runs 6–10 | None | 0 | 0 | 101 | 45 | 5430 | 4070 | 10 | 0.9490 | 251 |
| 13 | Noninvention | $C_2H_2$ | 2.5 | 2.9 | 101 | 60 | 3170 | 3470 | 10 | 0.9507 | 357 |
| 14 | Noninvention | $(CH_3)_2CCH_2$ | 690 | 1400 | 101 | 40 | 6050 | 4030 | 9 | 0.9511 | 180 |
| 15 | Noninvention | $(CH_3)_2CCH_2$ | 550 | 1190 | 101 | 50 | 4790 | 3990 | 11 | 0.9490 | 378 |
| 16 | Control for Runs 13–15 | None | 0 | 0 | 101 | 47 | 4680 | 3660 | 12 | 0.9481 | 331 |
| 17 | Noninvention | $(CH_3)_2CCH_2$ | 525 | 1200 | 105 | 57 | 3980 | 3780 | 31 | 0.9481 | 179 |
| 18 | Control for Run 17 | None | 0 | 0 | 105 | 50 | 4780 | 3990 | 27 | 0.9490 | 158 |
| 19 | Invention | $CH_3OH$ | 0.34 | 0.5 | 104 | 55 | 3640 | 3340 | 23 | 0.9433 | 769 |
| 20 | Invention | $CH_3OH$ | 0.38 | 0.5 | 104 | 45 | 5250 | 3940 | 36 | 0.9444 | 684 |
| 21 | Invention | $CH_3OH$ | 0.85 | 1.0 | 104 | 45 | 5510 | 4130 | 22 | 0.9468 | 651 |
| 22 | Invention | $CH_3OH$ | 0.81 | 1.0 | 103 | 40 | 5890 | 3930 | 22 | 0.9453 | 839 |
| 23 | Control for Runs 19–22 | None | 0 | 0 | 104 | 50 | 5020 | 4190 | 20 | 0.9476 | 223 |
| 24 | Invention | $(C_2H_5)_3N$ | 0.10 | 0.44 | 104 | 56 | 4090 | 3820 | 24 | 0.9478 | 166 |
| 25 | Invention | $(C_2H_5)_3N$ | 0.13 | 0.59 | 104 | 65 | 3070 | 3330 | 27 | 0.9442 | >1000 |
| 26 | Control for Runs 24–25 | None | 0 | 0 | 104 | 55 | 4270 | 3910 | 34 | 0.9438 | 519 |
| 27 | Control for Runs 24–25 | None | 0 | 0 | 104 | 60 | 3770 | 3770 | 22 | 0.9469 | 808 |
| 28 | Noninvention | $CCl_4$ | 0.08 | 0.5 | 104 | 65 | 3690 | 4000 | 26 | 0.9504 | 169 |
| 29 | Control for | None | 0 | 0 | 104 | 60 | 4000 | 4000 | 26 | 0.9491 | 217 |

TABLE II-continued

| Run No. | Type of Run | Modifying Agent | Molar ratio, (modifying agent)/(Cr) | PPM[a] | Reactor Temp. °C. | Run Time Min. | Catalyst Activity, g/g/hr. | Productivity, Grams Polymer Per Gram Catalyst (g/g) | HLMI[b] | Density,[c] g/cc | ESCR,[d] hrs. |
|---|---|---|---|---|---|---|---|---|---|---|---|
| Run 28 | | | | | | | | | | | |

[a]Based on approximate weight of ethylene plus hexene-1 present.
[b]Test Method ASTM D 1238, Condition F.
[c]Test Method ASTM D 1505. Sample prepared by ASTM D 1928-80, Procedure C; sample conditioned by ASTM D 618, Procedure A.
[d]Test Method ASTM D 1693, Condition A.

Runs 6 through 9 carried out using CO as the modifying agent when compared to control runs 11 and 12 repeat and confirm the results shown in TABLE 1 discussed above.

A comparison of invention run 10 with control runs 11 and 12 also demonstrates the effectiveness of using $O_2$ as the modifying agent according to the invention under the conditions employed.

A comparison of non-invention runs 13 through 15 with control run 16 and non-invention run 17 with control run 18 demonstrates that acetylene and isobutene are not suitable for use as modifying agents according to the invention under the conditions employed.

A comparison of invention runs 19 through 22 with control run 23 establishes that an alcohol, such as methanol, is suitable for use as a modifying agent in accordance with the present invention.

Run 24 apparently employed too low a concentration of modifying agent, even though it is denoted as an invention run in TABLE II because an amine, specifically triethylamine, was used as the modifying agent. Invention run 25, also employing triethylamine as the modifying agent, demonstrates results consistent with invention runs employing other modifying agents within the scope of the present invention and compared with control run 26 shows approximately a two fold improvement in ESCR. The results from control run 27 appeared to be anomalous in comparison to the other control runs wherein no modifying agent was employed, and extraneous air ($O_2$) is suspected.

Runs 28 and 29 simply show that carbon tetrachloride is not suitable for use as a modifying agent at the molar concentration employed. No further tests with $CCl_4$ were made.

Thus the results shown in TABLE II show that carbon monoxide, oxygen, an alcohol (methanol), and an amine (triethylamine) are suitable for use as modifying agents in accordance with the present invention and that acetylene, isobutene and carbon tetrachloride are not suitable for use as modifying agents in accordance with the present invention under the conditions employed.

That which is claimed is:

1. A process to produce ethylene homopolymers and copolymers having substantially increased environmental stress crack resistance, said process consisting of introducing into a polymerization reactor under gas phase polymerization conditions:
   a) a feedstream containing at least one olefin selected from the group consisting of ethylene and mixtures of ethylene with at least one other aliphatic mono-1-olefin;
   b) a polymerization catalyst consisting essentially of chromium oxide supported on a refractory metal oxide; and
   c) carbon monoxide;

wherein the amount of carbon monoxide is within the range of about 0.1 to about 0.7 parts per million carbon monoxide based on the total olefin present during the polymerization reaction.

2. A process to produce a polymer, said process consisting of introducing into a polymerization reactor under gas phase polymerization conditions:
   a) a feedstream containing at least one olefin selected from the group consisting of ethylene and mixtures of ethylene with at least one other aliphatic mono-1-olefin;
   b) a polymerization catalyst consisting essentially of chromium oxide supported on a refractory metal oxide; and
   c) carbon monoxide;

wherein the amount of carbon monoxide is within the range of about 0.1 to about 0.7 parts per million based on the total olefin present during the polymerization reaction and is an amount sufficient to increase the environmental stress cracking resistance and maintain essentially the same catalyst activity, melt index, and density of the polymer, compared to the environmental stress cracking resistance, catalyst activity, melt index, and density of a polymer produced under substantially identical polymerization conditions except without the introduction of the carbon monoxide.

* * * * *